United States Patent Office 2,773,058
Patented Dec. 4, 1956

2,773,058
Δ⁴-PREGNENES

Seymour Bernstein, Pearl River, N. Y., and Robert Herman Lenhard, Ridgefield Park, N. J., assignors to American Cyanamid Company, New York, N. Y., a corporation of Maine No Drawing. Application June 30, 1955,
Serial No. 519,248

3 Claims. (Cl. 260—239.55)

This invention relates to new steroid compounds. More particularly, it relates to the 9β,11β-oxide of Δ⁴-pregnenes, esters thereof and methods of preparing the same.

It has been known that 9α-fluoro-hydrocortisone is more active than hydrocortisone; Fried et al., J. Am. Chem. Soc. 75 2273 (1953 and 76 1455 (1954). However, 9α-fluoro-hydrocortisone has such a high electrolyte activity (sodium retention) that it can be used only topically and not systematically, L. E. Ward et al.; Proc. Mayo Clinic, 29 649 (1954). We have now found that 9α-halo-16α-hydroxy-hydrocortisone and esters thereof are highly active without the undesirable sodium retention effect. The new compounds of the present invention when tested by the method of Karnofsky et al., Endocrinology, 48, 596 (1951) are several times as active as 16α-hydroxy-hydrocortisone. In the thymus involution test described by R. I. Dorfman, Physiological Reviews, 34, 158 (1954), the present compounds show activity comparable to 9α-fluoro-hydrocortisone acetate without the undesirable electrolyte activity (sodium retention). At higher dosage levels the present compounds act as sodium excretors which are useful in the treatment of edemas. The new compounds (in the cotton ball test described by Meier et al., Experientia 6, 469 (1950) also show anti-inflammatory action which is at least equal to that of cortisone acetate. We have found that the 9β,11β-oxide of Δ⁴-pregnenes is an important intermediate in the preparation of 9α-halo-16α-hydroxy-hydrocortisone.

The new compounds of the present invention may be illustrated by the following general formula:

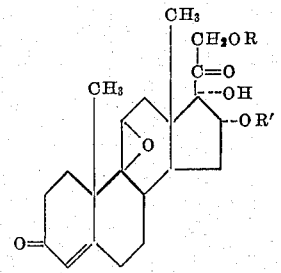

in which R and R' are members of the group consisting of hydrogen and lower alkanoyl radicals.

The compounds of the present invention are relatively high melting crystalline solids. They are soluble in the common organic solvents and relatively insoluble in water.

The compounds of the present invention are prepared by starting with the diester of Δ⁴,⁹⁽¹¹⁾,¹⁶-pregnatriene-21-ol-3,20-dione which is treated with osmium tetroxide to produce the corresponding Δ⁴,⁹⁽¹¹⁾-pregnadiene-16α,17α,-21-triol-3,20-dione ester. The latter compound is then reacted with acetic anhydride, which acetylates the hydroxy group in the 16-position. The acetylated compound is then reacted with a N-bromo-acid amide and perchloric acid to produce Δ⁴-pregnene 9α-bromo-11β,- 16α,17α,21-tetrol-3,20-dione 16α,21 esters. The latter intermediate is then reacted with anhydrous potassium acetate, and subsequently reacetylated to produce Δ⁴-pregnene-16α,17α,21-triol-3,20-dione-9β,11β-oxide 16α,21-diester of the present invention.

As stated hereinbefore, the present compounds are useful as intermediates in preparing 9α-fluoro-16α-hydroxy-hydrocortisone, described in our copending application Serial No. 519,249, filed June 30, 1955, which is very active physiologically. Its activity reaches, and in many instances exceeds that of cortisone or hydrocortisone without the undesirable side effects. The 9α-fluoro-compound may also be used internally for systemic effect and topically for local effect. The compound is used in the form of capsules, pills, tablets, solutions for injection, ointments, salves, and the like.

The following examples describe in detail the preparation of the 9β,11β-oxide of Δ⁴-pregnenes and esters thereof.

Example 1

A solution of 0.70 g. of Δ⁴,⁹⁽¹¹⁾¹⁶-pregnatriene-21-ol-3,20-dione 21-acetate and 0.50 g. of osmium tetroxide in 10 ml. of benzene and 0.5 ml. of pyridine was allowed to stand at room temperature for 18 hours. The osmate ester was decomposed by the addition of 35 ml. of water, 10 ml. of benzene, 23 ml. of methanol and 3.58 g. each of sodium sulfite and potassium bicarbonate. After stirring the mixture for 5 hours, approximately 150 ml. of chloroform was added and the stirring continued for ½ hour. The mixture was filtered through diatomaceous earth, the residue washed with hot chloroform and the organic layer separated. The aqueous phase was extracted several times with chloroform and the combined extracts were washed with saturated saline and with water. The dried extract was evaporated under reduced pressure and the residue crystallized from acetone-petroleum ether to give 0.62 g. of crude product, melting point 172–174° with previous softening. Three recrystallizations from acetone-petroleum ether gave 0.42 g. of pure Δ⁴,⁹⁽¹¹⁾-pregnadiene-16α,17α,21-triol-3,20 - dione 21 - acetate, melting point 195–197.5° with previous softening. One additional recrystallization did not alter the melting point; λmax. abs. alc. 238.5 mμ (ε16,700); [α]$_D^{25}$+93° (chloroform).

To a solution of 325 mg. of Δ⁴,⁹⁽¹¹⁾-pregnadiene-16α,-17α,21-triol-3,20-dione 21 acetate in 20 ml. of pyridine was added 2 ml. of acetic anhydride, and the mixture was allowed to stand at room temperature for 3 days. The solution was poured into water, cooled and the product was filtered and washed with water to give 0.33 g. of pure Δ⁴,⁹⁽¹¹⁾-pregnadiene-16α,17α,21-triol-3,20 - dione 16α,21-diacetate, melting point 193–195° with previous softening. Two crystallizations from acetone-petroleum ether gave 0.28 g. of pure diacetate, melting point 194–195° with previous softening; λmax. abs. alc. 238–239 mμ (ε17,400); [α]$_D^{25}$+43° (chloroform).

The diene diacetate, Δ⁴,⁹⁽¹¹⁾-pregnadiene-16α,17α,21-triol-3,20-dione 16α,21-diacetate (0.50 g.), in dioxane (20 ml.) and water (4 ml.) was treated with N-bromoacetamide (0.31 g.) and 10% perchloric acid (2 ml.). After allowing to stand for 15 minutes at 20°, excess sodium sulfite and water were added. The resultant soft solid was extracted with chloroform and the extract washed with saturated saline, dried, filtered through diatomaceous earth and evaporated under reduced pressure to an oil. Crystallization from acetone-petroleum ether gave 0.45 g. of crude bromohydrin, melting point 130–133.5° dec., with previous browning. Three crystallizations from acetone-petroleum ether gave 0.31 g. of Δ⁴-pregnene-9α-bromo-11β,16α,17α,21-tetrol - 3,20 - dione 16α,21-diacetate, melting point 125–126° dec. with previous browning; $\lambda_{max}$. abs. alc. 243 m$\mu$ ($\epsilon$14,000); $[\alpha]_D^{25}+76°$.

A solution 14.5 g. of $\Delta^4$-pregnene-9$\alpha$-bromo-11$\beta$,16$\alpha$,17$\alpha$,21-tetrol-3,20-dione 16$\alpha$,21-diacetate and 3.2 g. of anhydrous potassium acetate in 1 liter of absolute alcohol was refluxed for 18.5 hours. The reaction mixture was evaporated to dryness and the residue dissolved in ethyl acetate and water. The aqueous phase was extracted with ethyl acetate and the combined extracts were washed with saturated sodium bicarbonate solution and saline. The dried extract was evaporated and the residue dissolved in 35 ml. of pyridine, treated with 10 ml. of acetic anhydride and allowed to stand at room temperature overnight. Methanol and benzene were added and the solution was evaporated to dryness. Crystallization of the residue from methanol gave 6.5 g. of crude oxide diacetate, melting point 171.5–191.5° C. with previous softening, suitable for use in further transformations.

*Example 2*

The above $\Delta^4$-pregnene-16$\alpha$,17$\alpha$,21-triol-3,20-dione 9$\beta$,11$\beta$-oxide 16$\alpha$,21-diacetate is hydrolyzed under mildly alkaline conditions to produce the corresponding $\Delta^4$-pregnene-16$\alpha$,17$\alpha$,21-triol-3,20-dione 9$\beta$,11$\beta$-oxide.

We claim:
1. A compound selected from those having the general formula:

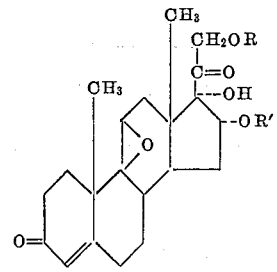

in which R and R' are members of the group consisting of hydrogen and lower alkanoyl radicals.

2. The compound $\Delta^4$-pregnene-16$\alpha$, 17$\alpha$,21-triol-3,20-dione-9$\beta$,11$\beta$-oxide.

3. The compound $\Delta^4$-pregnene-16$\alpha$, 17$\alpha$,21-triol-3,20-dione-9$\beta$,11$\beta$-oxide 16$\alpha$,21-diacetate.

No references cited.